July 31, 1951 — G. R. G. GATES — 2,562,354
ADJUSTING MEANS FOR BRAKES
Filed Dec. 4, 1945
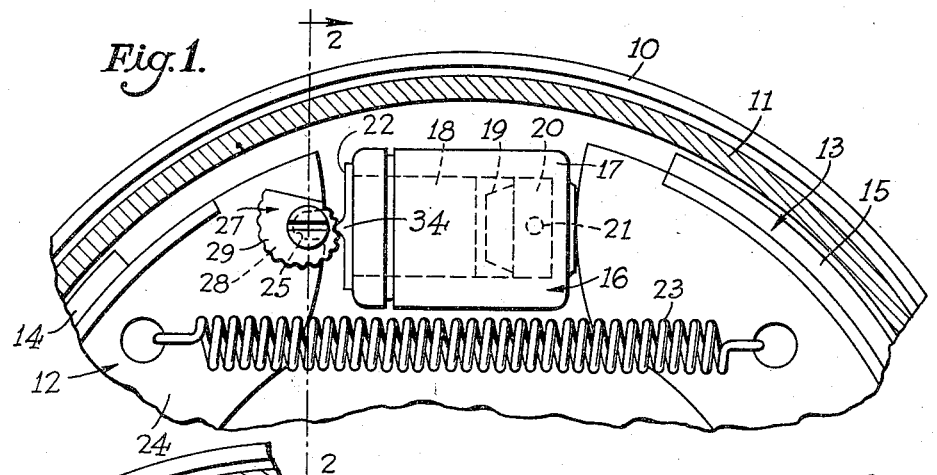
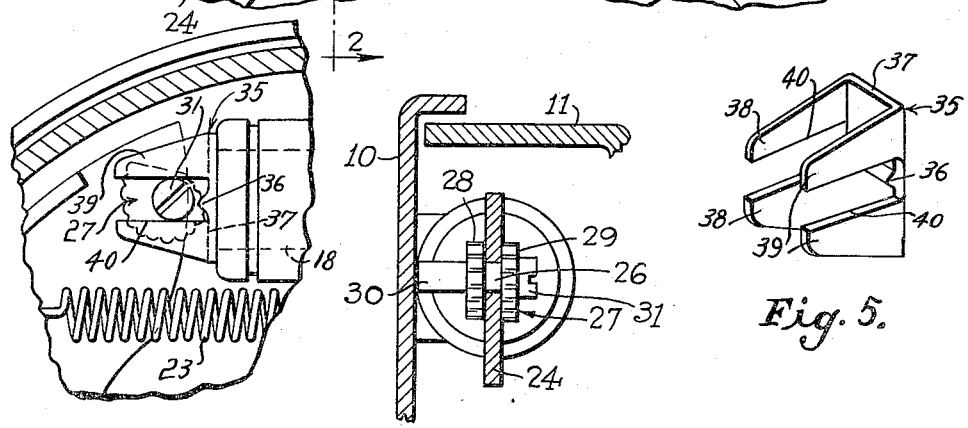
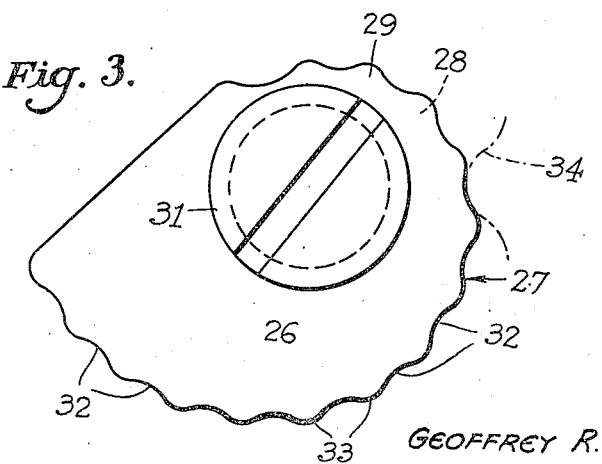
INVENTOR.
GEOFFREY R. G. GATES.
BY T. J. Plante
ATTORNEY.

Patented July 31, 1951

2,562,354

UNITED STATES PATENT OFFICE 2,562,354

ADJUSTING MEANS FOR BRAKES

Geoffrey Robert Greenbergh Gates, Leamington Spa, England, assignor to Automotive Products Company Limited, Leamington Spa, England Application December 4, 1945, Serial No. 632,645
In Great Britain December 4, 1944

6 Claims. (Cl. 188—79.5)

This invention relates to adjusting means for the rigid arcuate shoes of internal drum brakes and it has for its object to provide an improved form of adjuster of the angularly movable cam type, the operative cam surface usually being of substantially spiral or involute shape.

In particular it is the object of the invention to provide a simple adjuster of the kind described, which is positively located when set to any one of a relatively large number of positions throughout the operative range.

In an internal shoe drum brake having an adjuster of the cam type arranged so that angular movement of the cam advances a brake shoe towards the drum surface, the invention is characterized by the fact that the cam surface is formed with a series of notches defining different operating portions, the cam follower being shaped to engage within said notches in succession as the cam is turned. Preferably the cam surface is of smoothly curved undulating shape, the notches being concave and the intervening portions convex. The cam follower can comprise a rib or projection extending parallel with the cam turning axis and shaped to fit into the notches. Also two cams may be provided in axially spaced relationship upon a common spindle, said cams being engaged simultaneously by a single rib or projection. Conveniently the spindle is pivoted to a web of the brake shoe and the two cams lie one on each side of said web, the cam follower comprising a rib or projection formed upon the piston of a fluid pressure shoe-spreading device. The spindle of the cam may be extended to bear against the usual backplate of the brake to serve as a steady for the corresponding brake shoe. If desired the two cams may be integral with the spindle and also with a head slotted or otherwise shaped to receive a key for turning the cams.

The invention is illustrated by way of example in the accompanying drawings, in which:

Figure 1 is a fragmentary side elevation showing the upper part of a brake of the two leading shoe type;

Figure 2 is a fragmentary sectional elevation taken on the line 2—2 of Figure 1;

Figure 3 is an enlarged front elevation of one of the adjusting cams shown in Figures 1 and 2;

Figure 4 is a fragmentary side elevation showing the upper part of a brake which incorporates a modified version of the invention; and Figure 5 is an isometric view of the "mask," or channel-shaped member, which is placed between the adjustor and the piston in Figure 4.

The brake itself is of the normal form and comprises a fixed circular backplate 10 which closes the open end of a rotatable cylindrical brake drum 11 and which serves as a mounting for a pair of rigid arcuate brake shoes 12 and 13, these being of T-shape in cross section and being fitted with linings 14 and 15 in the usual manner for engagement of the internal surface of the drum 11. A hydraulic motor unit 16 is secured to the backplate 10 between the ends of the shoes 12 and 13 and comprises a cylinder 17 which is securely fastened to the backplate 10 and serves as an anchorage for the shoe 13 since the latter is arranged to be spread into engagement with the drum 11 by a hydraulic motor (not shown) which is disposed at the bottom of the brake drum and is identical with the motor 16. A plunger 18 is fitted slidably within the cylinder 17 and has a packing cup 19 in the usual manner so that the plunger 18 is urged towards the left when pressure fluid is admitted to the working space 20 through an inlet passage indicated at 21. The plunger 18 is formed with a head portion 22 which is of larger diameter than the bore of the cylinder 17 and is arranged to abut against the end of the cylinder 17 when the brake is released. The brake shoes 12 and 13 are urged inwards towards their released position by a pair of coiled tension springs, the upper one of which is seen at 23.

The web 24 of the shoe 12, where it faces the end of the plunger 18, is formed with a substantially U-shaped notch 25 arranged to accommodate rotatably the spindle 26 of an adjusting device which latter is indicated generally at 27. Formed integrally upon the spindle 26 are two snail shape cams 28 and 29 which fit snugly against the sides of the web 24 so as to keep the spindle 26 steady. The spindle 26 has an extension 30 which bears against the backplate 10 for the purpose of helping to locate the shoe 12 in its correct plane while the opposite end of the spindle 28 is formed with a slotted head 31 adapted to be engaged by a screw driver or other implement inserted through a suitable hole (not shown) in the brake drum 11. The cams 28 and 29 are of the same size and are both of the shape shown to an enlarged scale in Figure 3. The spiral or involute surface of each is formed with a succession of notches 32 of concave arcuate shape, the intervening projecting portions 33 also being rounded so that the cam surface as a whole is of undulating shape. The notches 32 are engaged by a transverse rib or projection 34 formed upon the head 22 of the plunger 18, the spring 23 serving to hold the cam members 28 and 29 at all times in firm engagement with said rib or projection 34. It will be apparent that when the spindle 26 is rotated anti-clockwise the effective radius of the cams 28, 29 increases and the shoe 12 is moved progressively outwards. The undulations 32, 33 upon the cam surfaces are designed so that the correct brake shoe clearance is simply obtained by turning the adjuster 27 in an anti-clockwise direction as far as possible and then returning it slightly so that the ridge or flange enters the nearest notch 32. The use of concave notches 32 in the adjusting cams 28 and 29 has the advantage that this result can readily be achieved even although the snail cams 28 and 29 have a relatively large number of notches 32 (i. e. adjustment steps) within the somewhat limited maximum range of angular movement of the cams. Moreover, the notches 32 engage securely with the transverse ridge or projection 34 so that the adjustment is not likely to be upset by vibration or by harsh application of the brakes.

The adjuster for the brake shoe 13 is of course provided at the lower end of the latter while the corresponding hydraulic motor unit (not shown) serves as the anchorage for the brake shoe 12.

It will be understood that the arrangement which has been described is given merely by way of example and that the improved adjuster may be incorporated in brakes of various types. Thus it may be desirable in some cases for the adjuster to cooperate with an anchorage fixed to the backplate or equivalent. It may also be used with brake shoes of the floating type which engage an abutment at either end according to the direction of drum rotation, either between the shoe and a spreading device which serves also as an abutment, according to the direction of rotation, or between the shoe and an abutment independent of the spreading device. The adjuster may also be used with brakes of the self-energizing type. As a further alternative, the adjuster according to the invention may be mounted on a pin or like support on the backplate, the notches cooperating with a suitable projection on the shoe, the adjuster then serving merely as an abutment for the shoe in its "off" position, and not being required to transmit any thrust when the brake is applied. The adjuster may, of course, be mounted on the shoe, and engage with a suitably shaped fixed abutment on the backplate.

As shown in Figures 4 and 5, a channel-shaped stamping 35 having a rib, or projection, 36 extending across the interior of its base portion 37, may be interposed between the cam adjustor 27 and the piston 18, the sides 38 and 39 of channel-shaped member 35 extending alongside the cams 28 and 29, and being apertured, or slotted, as shown at 40, to allow access to the head 31 and to permit passage of the extension 30.

What I claim is:

1. In an internal shoe drum brake having the usual backplate, an adjustor of the cam type arranged so that angular movement of the cam advances a brake shoe towards the drum surface, said adjustor having a cam surface formed with a series of notches of smoothly curved undulant shape defining different operating positions and having a spindle which bears against the backplate, and a cam follower shaped to engage within said notches in succession as the cam turns.

2. In an internal shoe drum brake, an adjustor of the cam type arranged so that angular movement of the cam advances the brake shoe towards the drum surface, said adjustor having a cam surface which is formed with a series of notches defining different operating positions, and a channel-shaped member which fits over the adjustor and which has a rib extending across the interior of its base portion to serve as a cam follower shaped to engage within said notches in succession as the cam is turned.

3. An internal shoe drum brake as claimed in claim 2, having a fluid pressure shoe-spreading device provided with a piston, the base of the channel-shaped member engaging said piston.

4. In an internal shoe drum brake, an adjustor of the cam type arranged so that angular movement of the cam advances the brake shoe towards the drum surface, said adjustor comprising two cams provided in axially-spaced relationship upon a common spindle, each of said cams having a cam surface which is formed with a series of notches defining different operating positions, and a channel-shaped member which fits over the adjustor and which has a rib extending across the interior of its base portion to serve as a cam follower shaped to engage within said notches in succession as the cam is turned.

5. An internal shoe drum brake as claimed in claim 4, having a fluid pressure shoe-spreading device provided with a piston, the base of the channel-shaped member engaging said piston.

6. An internal shoe drum brake as claimed in claim 4, wherein the sides of the channel-shaped member are apertured to uncover the ends of the spindle on which the cams are mounted.

GEOFFREY ROBT. GREENBERGH GATES.

REFERENCES CITED

The following references are of record in the file of this patent:

UNITED STATES PATENTS

| Number | Name | Date |
|---|---|---|
| 1,643,548 | Dodge | Sept. 27, 1927 |
| 1,875,065 | Lyman | Aug. 30, 1932 |
| 2,074,362 | Bowen | Mar. 23, 1937 |
| 2,083,651 | House | June 15, 1937 |
| 2,138,205 | Rasmussen et al. | Nov. 29, 1938 |
| 2,167,706 | Berno | Aug. 1, 1939 |
| 2,423,015 | Goepfrich et al. | June 24, 1947 |